United States Patent
Eichner

(10) Patent No.: US 12,188,283 B2
(45) Date of Patent: Jan. 7, 2025

(54) GEARING DEVICE OF A PASSAGEWAY DEVICE

(71) Applicant: Kaba Gallenschütz GmbH, Bühl (DE)

(72) Inventor: Harald Eichner, Schwanau-Ottenheim (DE)

(73) Assignee: KABA GALLENSCHÜTZ GMBH, Bühl (DE)

( * ) Notice: Subject to any disclaimer, the term of this patent is extended or adjusted under 35 U.S.C. 154(b) by 192 days.

(21) Appl. No.: 17/553,962

(22) Filed: Dec. 17, 2021

(65) Prior Publication Data

US 2022/0195779 A1 Jun. 23, 2022

(30) Foreign Application Priority Data

Dec. 22, 2020 (EP) .................................. 20216440

(51) Int. Cl.
| | |
|---|---|
| *E05F 15/608* | (2015.01) |
| *E06B 11/08* | (2006.01) |
| *F16H 35/02* | (2006.01) |
| *F16H 37/06* | (2006.01) |

(52) U.S. Cl.
CPC ............ *E05F 15/608* (2015.01); *E06B 11/08* (2013.01); *F16H 35/02* (2013.01); *F16H 37/065* (2013.01); *E05Y 2201/434* (2013.01); *E05Y 2201/652* (2013.01); *E05Y 2201/716* (2013.01); *E05Y 2900/40* (2013.01)

(58) Field of Classification Search
CPC ...... F16H 35/02; F16H 37/065; E05F 15/608; E06B 11/08; E05Y 2201/434; E05Y 2201/652; E05Y 2201/716; E05Y 2900/40
See application file for complete search history.

(56) References Cited

U.S. PATENT DOCUMENTS

| | | | | |
|---|---|---|---|---|
| 1,409,900 A | * | 3/1922 | Adams, Jr. | F16H 35/02 475/17 |
| 2,861,635 A | * | 11/1958 | Orr | F16H 35/02 83/299 |
| 2,957,363 A | * | 10/1960 | Brewer | F16H 35/02 74/393 |
| 2006/0225690 A1 | * | 10/2006 | Arov | F16H 35/02 123/198 F |

FOREIGN PATENT DOCUMENTS

| | | |
|---|---|---|
| DE | 102005028712 A1 | 12/2006 |
| EP | 2011956 A2 | 1/2009 |
| EP | 3 736 402 * | 11/2020 |
| FR | 2443575 * | 7/1980 |
| FR | 2443575 A1 | 7/1980 |
| WO | 2018020279 A1 | 2/2018 |

* cited by examiner

*Primary Examiner* — William C Joyce
(74) *Attorney, Agent, or Firm* — CANTOR COLBURN LLP

(57) ABSTRACT

A gearing device for discontinuously moving at least two elements, in particular barrier elements of a passageway device, having a drive axis, a first active axis of rotation, formed for a torque-transmitting operative connection with the first element, in particular barrier element, a first non-uniformly translating gearing stage between the drive axis and the first active axis of rotation, a second active axis of rotation formed for a torque-transmitting operative connection with the second element, in particular barrier element, a second non-uniformly translating gearing stage between the drive axis and the second active axis of rotation.

14 Claims, 2 Drawing Sheets

GEARING DEVICE OF A PASSAGEWAY DEVICE

CROSS-REFERENCE TO RELATED APPLICATIONS

This application is related to and claims the benefit of European Patent Application No. 20216440.6, filed on Dec. 22, 2020, the contents of which are herein incorporated by reference in their entirety.

TECHNICAL FIELD

The disclosure relates to a gearing device for discontinuously moving at least two elements. The two elements can be barrier elements of a passageway device.

BACKGROUND

Herein considered passageway devices are for example tripod barriers or turnstiles. Said tripod barriers or turnstiles are used for controlling access and/or singularization of individuals. In this case, the barrier elements, for example, formed as barrier stiles of the tripod barrier or leaves of the turnstile, are moved when an individual passes therethrough so that generally one barrier element is located in front of the passing individual and one barrier element is located behind the passing individual. EP 2 011 956 B1 shows an exemplary tripod barrier.

SUMMARY

The present disclosure provides a gearing device for moving at least two elements, in particular barrier elements of a passageway device, which, with a simple structure and low-maintenance operation, allows for discontinuously moving the two elements. In particular, when using the gearing device for moving the barrier elements of a passageway device, it is intended to allow for comfortably walking through the passageway device while simultaneously allowing for reliable singularization.

The advantage is achieved with the features of the independent claims. Advantageous further embodiments are indicated in the dependent claims.

The disclosure shows a gearing device for discontinuously moving at least two elements. In particular, the two elements can be barrier elements of a passageway device. However, the described gearing device can be used as well for discontinuously moving two other elements.

In particular, the passageway device can be formed as a tripod barrier or turnstile. Usually, the tripod barrier has barrier stiles, which form the barrier elements. In this case, two or three barrier stiles rotate about a common vertical axis of rotation (output axis) or a common axis of rotation inclined towards the vertical for thereby controlling the access or for singularizing the entering individuals. In the turnstile, the barrier elements are formed as leaves of the turnstile, wherein the common axis of rotation (output axis) is vertical. The turnstile can have the basic appearance of a revolving door and/or primarily serve for controlling access and/or for singularization.

Furthermore, the passageway device can be a door, in particular a revolving door or a swing door as well, wherein the at least two elements to be discontinuously moved in this embodiment are formed by the leaves of the revolving door, or the leaves of the multi-leaf swing door.

The gearing device has a drive axis. Basically, the drive axis can be optionally formed, and for example, is the hub of a toothed wheel (drive wheel), a shaft or another component, which is rotatably disposed in a housing of the gearing device.

Furthermore, the gearing device includes a first active axis of rotation and a second active axis of rotation. The active axes of rotation, just like the drive axis, are physical elements of the gearing device, which, for example, are formed by hubs of associated toothed wheels (axis of rotation wheel) or by corresponding shafts. Preferably, also said active axes of rotation are rotatably mobile supported in the housing of the gearing device.

The first active axis of rotation is formed for being in torque-transmitting operative connection with the first element, in particular the first barrier element. There is a first non-uniformly translating gearing stage between the first active axis of rotation and the drive axis. In particular, it can be provided that the first active axis of rotation is torque-transmitting forcibly connected to both the drive axis and to the first element.

Forcibly connected means that the corresponding components always rotate simultaneously and cannot be uncoupled from each other.

The second active axis of rotation is formed for being in torque-transmitting operative connection with the second element, in particular the second barrier element. There is a second non-uniformly translating gearing stage between the second active axis of rotation and the drive axis. In particular, it can be provided that the second active axis of rotation is torque-transmitting forcibly connected to both the drive axis and to the second element.

In particular, the first and the second gearing stages can be formed so that the two active axes of rotation are forcibly connected to the drive axis. Therefrom resulting that upon a rotation of the drive axis, always the two active axes of rotation and thus also always both elements, which are to be moved discontinuously, are entrained into rotation. Thus, also the two elements to be moved discontinuously would be forcibly connected.

Also, in a drive via one of the two elements (e.g. first element), if for example an individual presses again the barrier element, this will inevitably result in a rotation of the drive axis and thus also in a rotation of the other active axis of rotation (e.g. the second active axis of rotation), which in turn inevitably entrains the other element (e.g. second element) into rotation.

The connection of the two active axes of rotation via the drive axis and the two non-uniformly translating gearing stages result in that the two elements, in particular the barrier elements, move simultaneously; however, at different speeds. In particular, for example, the first element, which is located in front of the passing individual, can initially move slower than the second element, which approaches the individual from the rear. Thereby, relatively fast, the second element closes the gap behind the individual. Thus, it is possible to prevent a second individual from passing the passageway device between the two elements and simultaneously with the first individual.

The first gearing stage includes a first translation curve. The second gearing stage includes a second translation curve. The respective translation curve is defined as the translation ratio over the angle of rotation of the drive axis. The two translation curves of the two gearing stages can be embodied the same.

In particular, it can be provided that the first translation curve and/or the second translation curve are/is formed so that the respective translation ratio continuously changes during a complete revolution of the drive axis.

Preferably, it is provided that the first translation curve of the first gearing stage and the second translation curve of the second gearing stage are the same, however, offset to each other. In particular, said offset relates to the angle of rotation of the drive axis. Preferably for example, the offset is 180°.

This means that a certain translation ratio of the first gearing stage after a rotation of the drive axis about 180° corresponds to the same translation ratio at the second gearing stage and vice versa.

As an alternative preferably, it is provided that the two translation curves are offset by 330° or 300° or 270° or 240° or 210° or 150° or 120° or 90° or 60°.

Basically, in addition to the first and second active axes of rotation, the gearing device can include further active axes of rotation. In particular, each active axis of rotation with its own gearing stage, which non-uniformly translates, can be connected to the drive axis. In particular, it can be provided that a third active axis of rotation is provided, the third translation curve thereof being offset by 30° or 60° or 90° or 120° with regard to the first translation curve and/or the second translation curve.

As an alternative to using the same translation curves, also the two translation curves of the first and the second gearing stages can be different.

In particular, a torque-transmitting operative connection is understood in that the elements for transmitting torque are in an operative connection. This can be achieved in particular in that two toothed wheels are meshing with each other or two friction wheels rub against each other. Accordingly, the wheels described in the following can always be formed as toothed wheels or friction wheels.

Preferably, it is provided that a drive wheel is disposed on the drive axis. The drive wheel can be a toothed wheel, in particular.

Furthermore preferably, it is provided that, on the first active axis of rotation, is disposed a first axis of rotation wheel, which is in torque-transmitting operative connection with the drive wheel for forming the first gearing stage. Preferably, the first axis of rotation wheel is a toothed wheel, also referred to as an axis of rotation toothed wheel. Preferably accordingly, said toothed wheel is meshing with the drive wheel. As an alternative, the first axis of rotation wheel can be formed as well as a friction wheel, for example. In this case, also the drive wheel is formed as a friction wheel.

Furthermore preferably, it is provided that, on the second active axis of rotation, is disposed a second axis of rotation wheel, which is in torque-transmitting operative connection with the drive wheel for forming the second gearing stage. Preferably, the second axis of rotation wheel is a toothed wheel, also referred to as an axis of rotation toothed wheel. Preferably accordingly, said toothed wheel is meshing with the drive wheel. As an alternative, the second axis of rotation wheel can be formed as well as a friction wheel. In this case, also the drive wheel is formed as a friction wheel.

Preferably, the two active axes of rotation and the drive axis are parallel to each other. Accordingly preferably, the wheels are spur gears.

Preferably, it is provided that the drive wheel and the two axis of rotation wheels have respective non-round rolling curves.

Preferably, the two rolling curves of the two axis of rotation wheels are congruent.

Preferably, the rolling curve of the drive wheel differs from the rolling curve of the first axis of rotation wheel and of the second axis of rotation wheel. As an alternative, the rolling curve of the drive wheel can be congruent with the rolling curve of the first axis of rotation wheel and/or with the rolling curve of the second axis of rotation wheel.

Preferably, the first axis of rotation wheel has a first rotation-based changeable effective radius. Said first effective radius is measured from the centre of rotation of the first axis of rotation wheel to the contact point between first axis of rotation wheel and drive wheel. As the first axis of rotation wheel and/or the drive wheel have/has a non-round rolling curve, the gearing stage can be embodied so that said effective radius changes when the wheels turn. Preferably, the drive wheel has an associated rotation-based changeable drive radius. Said drive radius is measured from the point of rotation of the drive wheel to the contact point between first axis of rotation wheel and drive wheel. Preferably, it is provided that the sum of the first effective radius and the associated drive radius is constant during a rotation of the drive wheel.

Preferably, the second axis of rotation wheel has a second rotation-based changeable effective radius. Said second effective radius is measured from the centre of rotation of the second axis of rotation wheel to the contact point between second axis of rotation wheel and drive wheel. As the second axis of rotation wheel and/or the drive wheel have/has a non-round rolling curve, the gearing stage can be embodied so that said effective radius changes when the wheels turn. Preferably, the drive wheel has an associated rotation-based changeable drive radius. Said drive radius is measured from the point of rotation of the drive wheel to the contact point between second axis of rotation wheel and drive wheel. Preferably, it is provided that the sum of the second effective radius and the associated drive radius is constant during a rotation of the drive wheel.

Furthermore preferably, it is provided that the distance between the first active axis of rotation and the drive axis is equal to the distance between the second active axis of rotation and the drive axis.

Preferably, it is provided that the axis of rotation wheels and the drive wheel are symmetric, in particular convex, with regard to a respective symmetry axis. Are defined a length along the respective symmetry axis and a width of the respective wheel vertically to the symmetry axis. Preferably, the active axis of rotation is located on the symmetry axis of the associated axis of rotation wheel and/or the drive axis is located on the symmetry axis of the drive wheel.

Furthermore preferably, it is provided that the length of the axis of rotation wheels is respectively greater than the width of the axis of rotation wheels. Preferably, at the widest spot of the respective axis of rotation wheel, a width line intersects off-centre a length line at the longest spot of the same axis of rotation wheel. Thereby resulting in particular in a pear-shaped embodiment of the axis of rotation wheels.

Preferably, the centre of rotation or the active axis of rotation of the respective axis of rotation wheel is disposed off-centre with regard to the length. Preferably additionally or alternatively, the centre of rotation or the active axis of rotation of the respective axis of rotation wheel is disposed centrally with regard to the width.

Furthermore preferably, it is provided that the length of the drive wheel is smaller than the width of the drive wheel. Preferably, at the widest spot of the drive wheel, a width line intersects off-centre a length line at the longest spot of the drive wheel. In particular, thereby resulting in an apple-shaped embodiment of the drive wheel.

As an alternative, it is possible that the width and the length of the drive wheel are the same. In this way, it would result in a trefoil-shaped embodiment of the drive wheel.

Furthermore, it is possible that the drive wheel takes a triangular-shaped embodiment.

Preferably, the centre of rotation or the drive axis of the drive wheel is disposed off-centre with regard to the length.

Preferably additionally or alternatively, the centre of rotation or the drive axis of the drive wheel is disposed centrally with regard to the width.

Preferably, the gearing device comprises a hollow output shaft for the torque-proof connection to the first element, in particular the barrier element, wherein the first active axis of rotation is in torque-transmitting operative connection with the hollow output shaft.

Furthermore preferably, the gearing device comprises an output shaft, which is located in the hollow output shaft. The output shaft is formed for the torque-proof connection to the second element, in particular the barrier element. The second active axis of rotation is in torque-transmitting operative connection with the output shaft via a fourth gearing stage.

By arranging the two shafts—output shaft and hollow output shaft—at least partially one inside the other, the two elements are able to rotate about a common output axis. This allows for a compact structure.

Furthermore preferably, it is provided that, for transmitting torque, the gearing device includes a first idler wheel, which is connected, in particular torque-proof, to the first axis of rotation wheel. The first idler wheel is in torque-transmitting operative connection, in particular in contact or in engagement with the hollow output shaft. Preferably, a first driven wheel, which is in torque-transmitting contact or engagement with the first idler wheel, is located on the hollow output shaft. In particular, the first idler wheel and the first driven wheel can be formed as toothed wheels or friction wheels.

Furthermore preferably, it is provided that, for transmitting torque, the gearing device includes a second idler wheel, which is connected, in particular torque-proof, to the second axis of rotation wheel. The second idler wheel is in torque-transmitting operative connection, in particular in contact or in engagement with the output shaft. Preferably, a second driven wheel, which is in torque-transmitting contact or engagement with the second idler wheel, is located on the output shaft. In particular, the second idler wheel and the second driven wheel can be formed as toothed wheels or friction wheels.

By arranging the output shaft in the hollow output shaft, the output shaft can protrude from the hollow output shaft so that, at the protruding end of the output shaft, the second driven wheel can be disposed coaxially to the first driven wheel. Said two coaxial driven wheels are in torque-transmitting operative connection with the two idler wheels of the third and fourth gearing stages. In this case, the two idler wheels can be disposed in particular coaxially to the respective active axes of rotation and in particular be connected torque-proof to the respective axis of rotation wheel.

Preferably, the gearing device comprises an electric motor torque-transmitting connected to the drive axis and/or a damping device torque-transmitting connected to the drive axis and/or a coupling torque-transmitting connected to the drive axis and/or a brake torque-transmitting connected to the drive axis.

When using the electric motor, the drive axis can be entrained into rotation, whereby forcibly also the two active axes of rotation and thus the two elements rotate.

Furthermore, it is also possible that, for example an individual pressing against one of the two elements, manually entrains into rotation the element and thus also the associated active axis of rotation. In this case, on account of the force-connected connection via the first and the second gearing stages, simultaneously the drive axis and the other active axis of rotation rotate. For dampening, for slowing down or otherwise influencing the movement, the drive axis can be connected to the damping device and/or to the brake and/or to the coupling.

Preferably, the gearing device comprises a crank axis, which is off-set or coaxially to the drive axis. In particular, the damping device and/or the brake and/or the coupling and/or the output shaft of the electric motor can be in operative connection with the crank axis. Particularly preferred, the output axis of the electric motor is coaxial to the crank axis.

In particular, a translation ratio i, as the ratio of the rotational speed of the crank axis, is defined as dividend to the rotational speed of the drive axis. In particular, the translation ratio i and thus the crank axis can be formed so that i>1, in particular, i=n/1, wherein n corresponds to the number of elements, in particular to the number of barrier elements.

Furthermore, it can be provided to dispose a pulley on the drive axis, which pulley a belt entrains into rotation. The belt in turn can be driven via the electric motor.

Furthermore, the disclosure comprises a tripod barrier for controlling access and/or singularization, comprising the gearing device, as described above, and at least two barrier elements, formed as barrier stiles, which are rotatably supported about the common output axis, and are torque-transmitting connected to a respective one of the active axes of rotation of the gearing device.

Furthermore, the disclosure comprises a turnstile for controlling access and/or singularization, comprising the gearing device, as described above, and at least two barrier elements, formed as turnstile leaves, which are rotatably supported about the common output axis, and are torque-transmitting connected to a respective one of the active axes of rotation of the gearing device.

Furthermore, the disclosure describes the use of the described gearing device in a tripod barrier for moving the barrier elements, formed as barrier stiles of the tripod barrier, or in a turnstile for moving the barrier elements, formed as turnstile leaves of the turnstile, or in a revolving door for moving the barrier elements, formed as revolving door leaves of the revolving door, or in a two-leaf swing door for moving the barrier elements, formed as door leaves of the swing door.

BRIEF DESCRIPTION OF THE DRAWINGS

Now, the disclosure is described in more detail based on an exemplary embodiment. In this case, it shows.

DETAILED DESCRIPTION OF THE DRAWINGS

Figure 1:
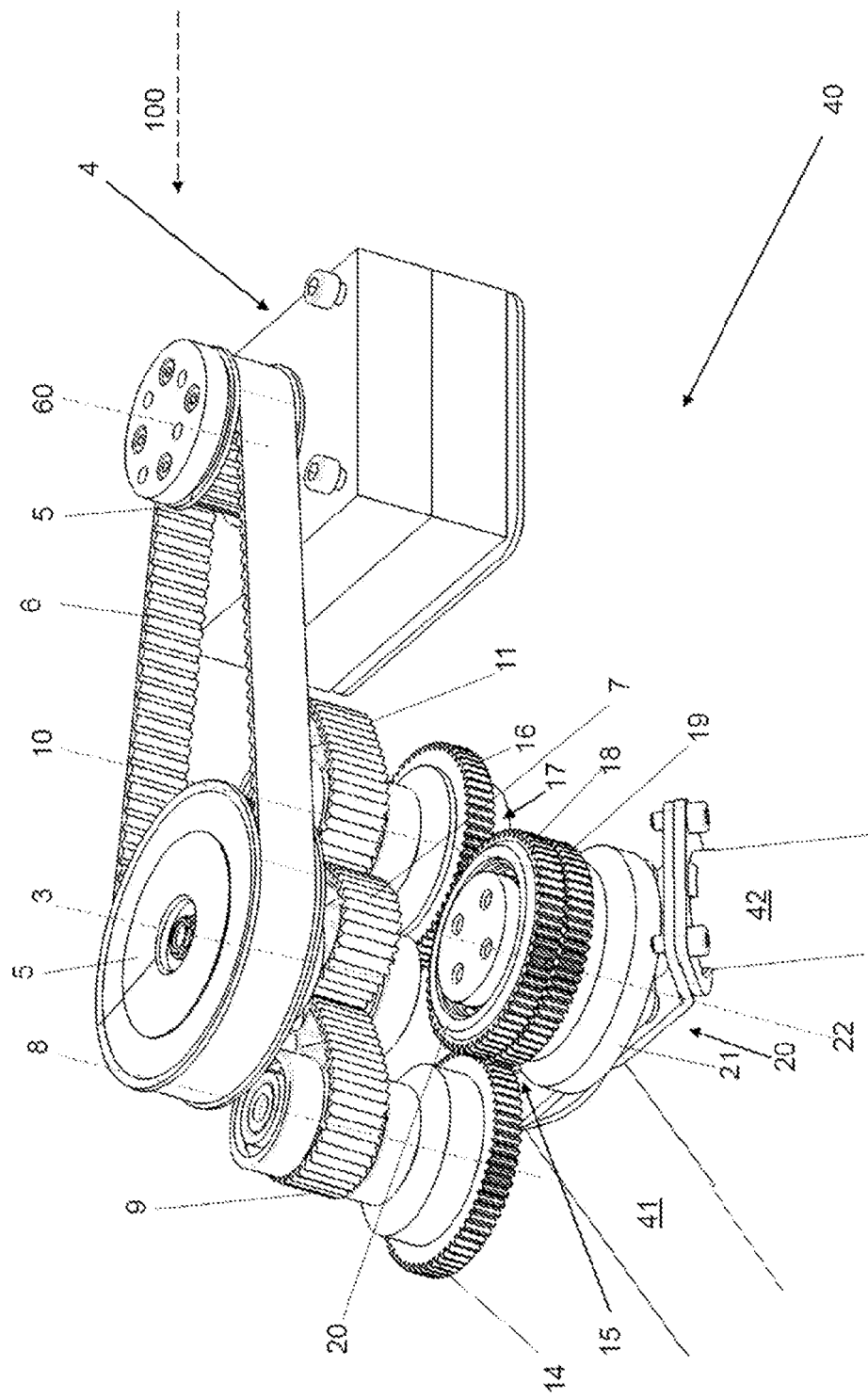
FIG. 1 a perspective of an inventive passageway device, formed as a tripod barrier, with the inventive gearing device according to an exemplary embodiment, and FIG. 2 a detail of the inventive gearing device according to FIG. 1.
Figure 2:
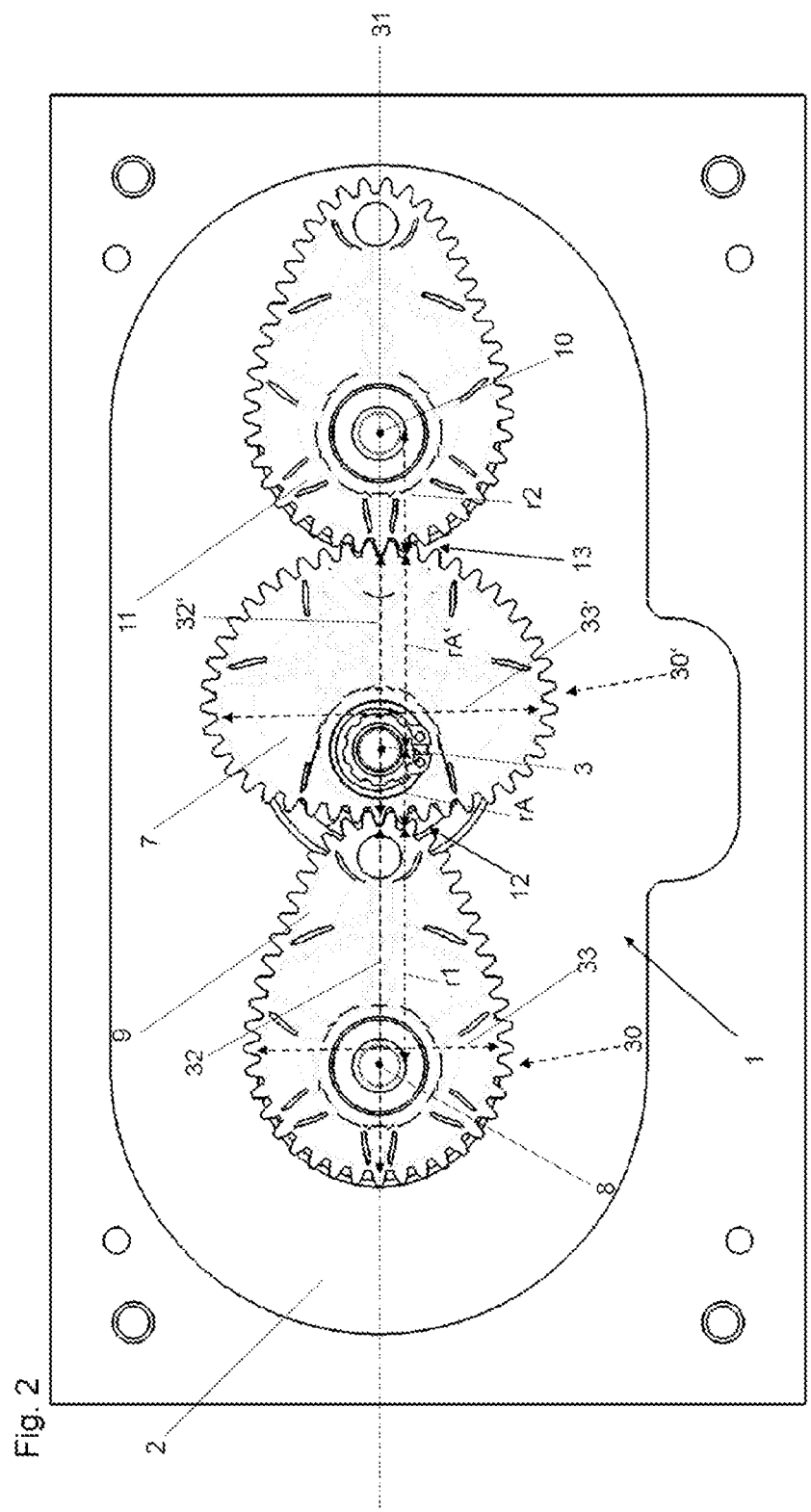

In the following based on FIGS. 1 and 2 is explained a passageway device 40 formed as a tripod barrier. The passageway device 40 comprises a gearing device 1 for discontinuously moving two barrier elements 41, 42, herein formed as barrier stiles. In the following, unless otherwise stated, reference is always made to all the Figures.

For example, the passageway device 40 is passed in the passageway direction 100 indicated in FIG. 1. In this case, in passageway direction 100, the first barrier element 41 prevents the passing individual from passing, respectively when moving the first barrier element 41, the passing individual can follow said first barrier element 41 and thereby pass the passageway device 40. When passing the passageway device 40, the two barrier elements 41, 42 rotate about an output axis 22.

The gearing device 1 comprises a housing 2, which is diagrammatically illustrated in FIG. 2. A drive axis 3 is rotatably mobile supported in the housing 2. With a dashed line, FIG. 1 shows the imaginary extension of said drive axis 3. A pulley 5 is located coaxially on the drive axis 3.

Furthermore, the gearing device 1 comprises an electric motor 4, which drives a further pulley 5 rotating about a crank axis 60. The two pulleys 5 are drivingly connected to each other via a belt 6 so that, with rotating electric motor 4, also the drive axis 3 rotates.

Furthermore, the gearing device 1 includes a first active axis of rotation 8 and a second active axis of rotation 10. FIG. 1 shows the imaginary extension to said two active axes of rotation 8, 10 in a dashed illustration.

The drive axis 3 and the two active axes of rotation 8, 10 are offset and parallel to each other. Also, said three axes are parallel to the output axis 22.

A drive wheel 7, herein formed as a toothed drive wheel, is located on the drive axis 3. A first axis of rotation wheel, herein formed as a first axis of rotation toothed wheel, is located on the first active axis of rotation 8. A second axis of rotation wheel, herein formed as a second axis of rotation toothed wheel, is located on the second active axis of rotation 10.

The toothed drive wheel 7 is in engagement with the first axis of rotation wheel 9 and thereby forms a first gearing stage 12. Furthermore, the drive wheel 7 is in engagement with the second axis of rotation wheel 11 and thereby forms a second gearing stage 13.

A first idler wheel 14 is located coaxially and torque-proof on the first active axis of rotation 8. A second idler wheel 16 is located coaxially and torque-proof on the second active axis of rotation 10.

An output shaft 20 and a hollow output shaft 21 are provided coaxially to the output axis 22. The output shaft 20 is partially located in the hollow output shaft 21. The output shaft 20 is torque-proof connected to the second barrier element 42. The hollow output shaft 21 is torque-proof connected to the first barrier element 41. A first driven wheel 19 is placed on the hollow output shaft 21. A second driven wheel 18 is placed on the output shaft 20. Said two driven wheels 18, 19 are respectively torque-proof connected to the output shaft 20 or to the hollow output shaft 21 and are coaxially placed on the output axis 22.

The first idler wheel 14 is in engagement with the first driven wheel 19 and thereby forms a third gearing stage 15. The second idler wheel 16 is in engagement with the second driven wheel 18 and thereby forms a fourth gearing stage 17.

The third gearing stage 15 and the fourth gearing stage 17 realize a forced drive of the hollow output shaft 21 and the output shaft 20 and thus also of the two barrier elements 41, 42 during a rotation of the drive axis 3 or of the drive wheel 7.

Now, if an individual passes the barrier in passageway direction 100, based on the following described gearing device 1, initially the first barrier element 41 moves slowly and later fast, while the second barrier element 42 initially moves fast and later slowly. In this way, allowing for a better singularization, in that the trailing barrier element 42 initially moves fast and later slowly, so that another individual can hardly squeeze between the individual and the trailing barrier element 42.

FIG. 2 shows the gearing device 1, the drive wheel 7 between the two axis of rotation wheels 9, 11 in a top view. Accordingly, the two axis of rotation wheels 9, 11 have a respective rolling curve 30. The rolling curves 30 of said two axis of rotation wheels 9, 11 are congruent. The drive wheel 7 has a rolling curve 30'. The rolling curves 30 and 30' of all three wheels are non-round.

With regard to the indicated symmetry axis 31, the axis of rotation wheels 9, 11 and the drive wheel 7 are formed symmetrically. The respective centre of rotation of the drive wheel 7, of the first axis of rotation wheel 9 or of the second axis of rotation wheel 11 is located on the associated symmetry axis 31.

The width 33 of the axis of rotation wheels 9, 11, or the width 33" of the drive wheel 7 is defined vertically to the symmetry axis 31. A length 32 of the axis of rotation wheels 9, 11 or a length 32" of the drive wheel 7 is defined parallel to the symmetry axis 31 and thus vertically to the width.

For the two axis of rotation wheels 9, 11, the length 32 is respectively greater than the width 33. For the drive wheel 7, the width 33" is greater than the length 32".

Furthermore, FIG. 2 shows a first effective radius r1 of the first axis of rotation wheel 9 and a second effective radius r2 of the second axis of rotation wheel 11, respectively measured from the centre of rotation to the contact point with the drive wheel 7. The drive wheel 7 has a drive radius rA to the contact point with the first axis of rotation wheel 9. The drive radius to the second axis of rotation wheel 11 is indicated with rA'.

Furthermore, it is provided that the individual effective radii r1, r2 as well as the drive radii rA, rA' change during rotation of the gearing device 1, however, the sum of r1 and rA as well as the sum of r2 and rA' remain constant during rotation.

Such formed gearing device shows a compact and reliable solution for discontinuously moving two forcibly connected elements.

The invention claimed is:

1. A passageway device for controlling access and/or singularization of individuals comprising a gearing device for discontinuously moving at least two barrier elements, of a passageway device, the gearing device comprising:
    a drive axis,
    a first active axis of rotation formed for torque-transmitting operative connection to the first barrier element,
    a first non-uniformly translating gearing stage between the drive axis and the first active axis of rotation,
    a second active axis of rotation formed for torque-transmitting operative connection to the second barrier element,
    a second non-uniformly translating gearing stage between the drive axis and the second active axis of rotation, the passageway device formed as a tripod barrier, wherein the at least two barrier elements formed as barrier stiles, which are rotatably supported about a common output axis and are torque-transmitting connected to a respective one of the active axes of rotation of the gearing device.

2. The passageway device according to claim 1, wherein the first gearing stage includes a first translation curve, defined as the translation ratio over the angle of rotation of the drive axis, wherein the second gearing stage includes a second translation curve, defined as the translation ratio over the angle of rotation of the drive axis, and wherein the first translation curve of the first gearing stage and the second translation curve of the second gearing stage are the same, however, offset to each other with regard to the angle of rotation of the drive axis.

3. The passageway device according to claim 2, wherein the first translation curve of the first gearing stage and the second translation curve of the second gearing stage are the same, however, offset to each other by 180° with regard to the angle of rotation of the drive axis.

4. The passageway device according to claim 1,
wherein a drive wheel is disposed on the drive axis,
wherein on the first active axis of rotation is disposed a first axis of rotation wheel, which is in torque-transmitting operative connection with the drive wheel for forming the first gearing stage,
and on the second active axis of rotation is disposed a second axis of rotation wheel, which is in torque-transmitting operative connection with the drive wheel for forming the second gearing stage.

5. The passageway device according to claim 4, wherein the drive wheel and the axis of rotation wheels have respective non-round rolling curves.

6. The passageway device according to claim 5, wherein the rolling curves of the axis of rotation wheels and the rolling curve of the drive wheel are different or the same.

7. The passageway device according to claim 5,
wherein, with regard to a respective symmetry axis, the axis of rotation wheels and the drive wheel are symmetric, and along the respective symmetry axis, have a length and, vertically to the symmetry axis, have a width,
and wherein the active axis of rotation is located on the symmetry axis of the associated axis of rotation wheel and/or the drive axis is located on the symmetry axis of the drive wheel.

8. The passageway device according to claim 4, wherein both axis of rotation wheels comprise rolling curves, which are the same.

9. The passageway device according to claim 4,
wherein the first axis of rotation wheel has a first rotation-based changeable effective radius and, the drive wheel has an associated rotation-based changeable drive radius, wherein the sum of the first effective radius and the drive radius is constant during a rotation of the drive wheel,
and/or wherein the second axis of rotation wheel has a second rotation-based changeable effective radius and the drive wheel has an associated rotation-based changeable drive radius, wherein the sum of the second effective radius and the drive radius is constant during a rotation of the drive wheel.

10. The passageway device according to claim 9,
wherein the length of the axis of rotation wheels is respectively greater than the width of the axis of rotation wheels,
and/or wherein the length of the drive wheel is smaller than the width of the drive wheel.

11. The passageway device according to claim 1, further comprising:
a hollow output shaft for a torque-proof connection to the first barrier element, wherein the first active axis of rotation is in torque-transmitting operative connection with the hollow output shaft via a third gearing stage,
and an output shaft, which is at least partially disposed in the hollow output shaft, for a torque-proof connection to the second barrier element, wherein the second active axis of rotation is in torque-transmitting operative connection with the output shaft via a fourth gearing stage.

12. The passageway device according to claim 11, further comprising:
for transmitting torque, a first idler wheel connected to the first axis of rotation wheel and in torque-transmitting operative connection with the hollow output shaft,
and for transmitting torque, a second idler wheel connected to the second axis of rotation wheel and in torque-transmitting operative connection with the output shaft.

13. The passageway device according to claim 1, comprising an electric motor connected to the drive axis and/or a damping device connected to the drive axis and/or a coupling connected to the drive axis and/or a brake connected to the drive axis.

14. A passageway device for controlling access and/or singularization of individuals comprising a gearing device for discontinuously moving at least two barrier elements, of a passageway device, the gearing device comprising:
a drive axis,
a first active axis of rotation formed for torque-transmitting operative connection to the first barrier element,
a first non-uniformly translating gearing stage between the drive axis and the first active axis of rotation,
a second active axis of rotation formed for torque-transmitting operative connection to the second barrier element,
a second non-uniformly translating gearing stage between the drive axis and the second active axis of rotation,
the passageway device formed as a turnstile wherein the at least two barrier elements formed as turnstile leaves, which are rotatably supported about a common output axis and are torque-transmitting connected to a respective one of the active axes of rotation of the gearing device.

* * * * *